US012695607B2

(12) United States Patent
Wesselkamper et al.

(10) Patent No.: US 12,695,607 B2
(45) Date of Patent: Jul. 28, 2026

(54) INTEGRATED CIRCUIT PROTECTION USING STACKED DIES

(71) Applicant: XILINX, INC., San Jose, CA (US)

(72) Inventors: James D. Wesselkamper, Albuquerque, NM (US); Thomas Paul Leboeuf, Sandia Park, NM (US); Steve E. Mcneil, Los Ranchos, NM (US); Jason J. Moore, Albuquerque, NM (US); James Anderson, Madison, AL (US)

(73) Assignee: XILINX, INC., San Jose, CA (US)

( * ) Notice: Subject to any disclaimer, the term of this patent is extended or adjusted under 35 U.S.C. 154(b) by 768 days.

(21) Appl. No.: 17/985,736

(22) Filed: Nov. 11, 2022

(65) Prior Publication Data

US 2024/0163092 A1     May 16, 2024

(51) Int. Cl.
*H04L 9/08* (2006.01)
*H10W 42/40* (2026.01)
*H10W 90/00* (2026.01)

(52) U.S. Cl.
CPC ........... *H04L 9/088* (2013.01); *H10W 42/405* (2026.01); *H10W 90/00* (2026.01); *H10W 90/722* (2026.01); *H10W 90/724* (2026.01)

(58) Field of Classification Search
CPC ... H04L 9/088; H04L 9/08; H04L 9/10; H04L 9/0866; H04L 9/0861; G06F 21/86; G06F 21/87; G06F 21/72; H01L 25/0657; H01L 25/162; H01L 25/16
See application file for complete search history.

(56) References Cited

U.S. PATENT DOCUMENTS

| | | | | |
|---|---|---|---|---|
| 9,225,512 B1 * | 12/2015 | Trimberger | ........... | H04L 9/0866 |
| 10,325,646 B1 * | 6/2019 | Trimberger | ........... | G11C 11/417 |
| 2020/0076622 A1 * | 3/2020 | Best | ...................... | H01L 23/573 |
| 2021/0124711 A1 * | 4/2021 | Ansari | .................. | G06F 21/575 |
| 2022/0029838 A1 * | 1/2022 | Bear | ...................... | H04L 9/3278 |
| 2022/0417041 A1 * | 12/2022 | Howard | ................... | H04L 9/14 |
| 2023/0187371 A1 * | 6/2023 | Parker | .................. | H10W 46/00 |
| | | | | 438/401 |

(Continued)

OTHER PUBLICATIONS

Zhou, K., et al., "FPGA-based RO PUF with low overhead and high stability." Electron. Lett., 55: 510-513, 2019, https://doi.org/10.1049/el.2019.0451.

(Continued)

*Primary Examiner* — Tae K Kim
(74) *Attorney, Agent, or Firm* — Patterson + Sheridan, LLP

(57) ABSTRACT

Stacked integrated circuit devices, chip packages and methods for operating a chip package are described herein that provide an increased level of backside protection from physical attacks that could compromise confidentiality or authentication of the integrated circuit device. In one example, a chip stack includes a sacrificial integrated circuit (IC) die stacked with a primary IC die. The sacrificial IC die includes a first split key information source. The primary IC die has security circuitry configured to generate an encryption key based at least in part on first split key information transmitted from the sacrificial IC die across a die-to-die interface to the primary IC die. Separation of the dies to probe or modify of the primary IC die would cause the destruction of split key information required to operate the functional circuitry of the primary IC die.

16 Claims, 5 Drawing Sheets

(56)         References Cited

U.S. PATENT DOCUMENTS

| | | | |
|---|---|---|---|
| 2023/0237143 A1* | 7/2023 | Nguansiri | ............... G06F 21/75 |
| | | | 726/18 |
| 2023/0291405 A1* | 9/2023 | Ahmad | ............ H03K 19/17736 |
| 2023/0336198 A1* | 10/2023 | Cameron | ................. H04B 1/10 |

OTHER PUBLICATIONS

Hertz, Jake, "An Introduction to Physically Unclonable Functions," All About Circuits, Jun. 14, 2021, https://www.allaboutcircuits.com/technical-articles/an-introduction-to-physically-unclonable-functions/.

Invia, "Understanding Physical Unclonable Function (PUF)," Design &Reuse, Mar. 23, 2020, https://www.design-reuse.com/articles/47717/understanding-physical-unclonable-function-puf.html.

Sardar, Zia, "Cryptography: Understanding the Benefits of the Physically Unclonable Function (PUF)," Maxim Integrated, APP 7629, Jun. 15, 2020, https://www.maximintegrated.com/en/design/technical-documents/tutorials/7/7269.html.

* cited by examiner

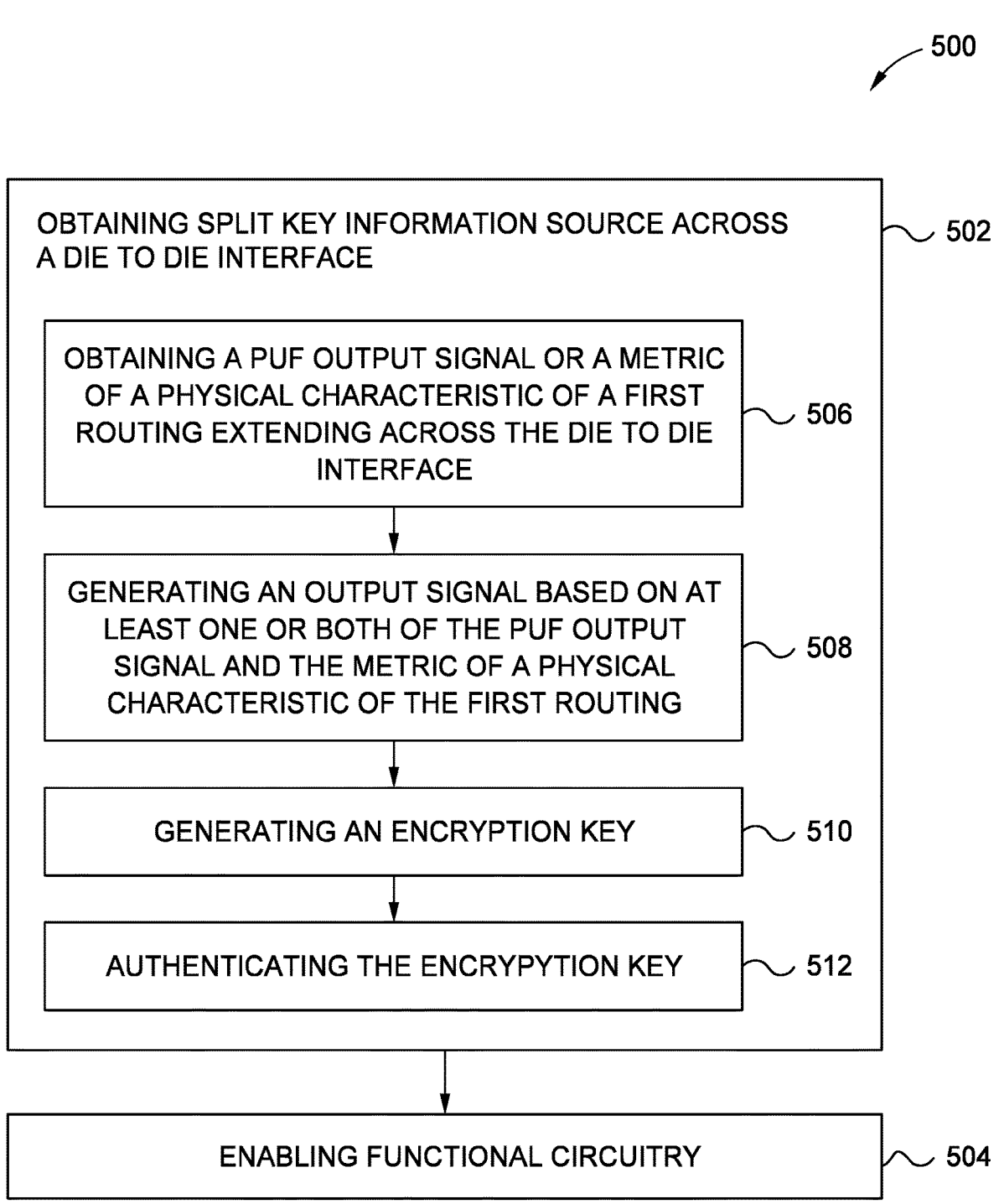

500

OBTAINING SPLIT KEY INFORMATION SOURCE ACROSS A DIE TO DIE INTERFACE — 502

OBTAINING A PUF OUTPUT SIGNAL OR A METRIC OF A PHYSICAL CHARACTERISTIC OF A FIRST ROUTING EXTENDING ACROSS THE DIE TO DIE INTERFACE — 506

GENERATING AN OUTPUT SIGNAL BASED ON AT LEAST ONE OR BOTH OF THE PUF OUTPUT SIGNAL AND THE METRIC OF A PHYSICAL CHARACTERISTIC OF THE FIRST ROUTING — 508

GENERATING AN ENCRYPTION KEY — 510

AUTHENTICATING THE ENCRYPYTION KEY — 512

ENABLING FUNCTIONAL CIRCUITRY — 504

FIG. 5

INTEGRATED CIRCUIT PROTECTION USING STACKED DIES

TECHNICAL FIELD

Embodiments of the present invention generally relate to integrated circuit devices having stacked dies, and in particular, to security for integrated circuit dies using split key encryption.

BACKGROUND

Electronic devices, such as tablets, computers, copiers, digital cameras, smart phones, control systems and automated teller machines, among others, often employ electronic components which leverage chip package assemblies for increased functionality and higher component density. Conventional chip packaging schemes often utilize a plurality of integrated circuit (IC) dies to be mounted to a single package substrate. The IC dies may include memory, logic or other IC devices.

Security for IC dies and chip packages has been improving over the last two decades, but many commercial products are still susceptible to a class of physical attacks that use backside access to perform laser attacks, focused ion beam attacks and similar attacks, which require close physical access. Volume protection and package-on-package protections provide limited benefit and provide a relatively low-level of security. Recent developments including 7 nm and smaller nodes, which require die substrate thinning to access the smallest feature sizes, and active-on-active stacked die present a significant challenge to thwarting the above mentioned physical attacks. The introduction of die stacking introduces new complexities such that internal signals being transported across TSVs and die-to-die interfaces that make convenient probe points should the middle die of a stacked assembly be exposed (e.g. by removal of one or more of the stacked dies). Such internal signals can convey unencrypted configuration data. Attacks imagined on stacked die assemblies involve grinding away layers leaving one exposed die of the stacked die assembly that could be connected with another die from a new die stack assemblies to create partially functional constructions on a lab bench. It is uncertain if current techniques could prevent such an attack.

Thus, there is a need for improved techniques to prevent unwanted physical attacks and unauthorized access to internal signals of IC dies.

SUMMARY

Stacked integrated circuit devices, chip packages and methods for operating a chip package are described herein that provide an increased level of backside and frontside protection from physical attacks that could compromise confidentiality or authentication of the integrated circuit device. In one example, a chip stack is provided that includes a sacrificial integrated circuit (IC) die stacked with a primary IC die. The sacrificial IC die includes a first split key information source. The primary IC die has security circuitry configured to generate an encryption key based at least in part on first split key information transmitted from the sacrificial IC die across a die-to-die interface to the primary IC die. The die-to-die interface is between the sacrificial die and the primary IC die, with optionally one or more additional dies between the sacrificial die and the primary IC die. The split key information provided by the sacrificial IC die is used to create key splits assembled into an encryption key in the primary IC die. Separation of the dies to probe or modify of the primary IC die would cause the destruction of split key information required to operate the functional circuitry of the primary IC die.

In another example, a chip stack is provided that includes a first integrated circuit (IC) die, a second IC die, a first routing extending across an interface connecting the first and second IC dies, and a first routing integrity circuitry disposed in the second IC die. The first IC die is stacked on the second IC die. The first routing has a first portion disposed in the first IC die, a second portion disposed in the second IC die, and a third portion disposed in the interface. The first routing integrity circuitry is coupled to the second portion of the first routing and is configured output a signal based at least in part on a metric of a physical characteristic of the first routing.

In another example, the second portion of the first routing includes routing residing in a metal layer of the second IC die that is disposed farther from the first IC die than one or both of the first routing integrity circuitry or security circuitry that generates an encryption key based at least in part on the output of the first routing integrity circuitry.

In another example, first summation circuitry is disposed in the second IC die. The first summation circuitry has a first input coupled to the first routing integrity circuit and a second input coupled through the interface to a first physical unclonable function (PUF) device disposed in the first IC die.

In another example, encryption key assembly circuitry is disposed in the second IC die and has a first input coupled to an output of the first summation circuitry. The encryption key assembly circuitry is located further from the die-to-die interface than the second portion of the first routing.

In another example, another chip package is provided that includes a package substrate, a first integrated circuit (IC) die, a second IC die, a first routing extending across an interface connecting the first and second IC dies, a first routing integrity circuitry disposed in the second IC die and coupled to the second portion of the first routing, encryption key assembly circuitry disposed in the second IC die in a location further from the interface than the second portion of the first routing, and authentication circuitry disposed in the second IC die. The first routing has a first portion disposed in the first IC die, a second portion disposed in the second IC die, and a third portion disposed in the interface. The first routing integrity circuitry is configured output a signal based on a metric of a physical characteristic of the first routing. The first routing integrity circuitry resides farther from package substrate than at least a portion of the first routing. The encryption key assembly circuitry is configured to generate an encryption key based at least in part on the metric of the physical characteristic of the first routing. The authentication circuitry is configured to authenticate the encryption key received from the encryption key assembly circuitry based at least in part on the encryption key being based at least in part on the metric of the physical characteristic of the first routing.

In another example, a method for operating a chip package is provided. The method includes obtaining first split key information from a first split key information source across an interface connecting first and second IC dies, the first obtaining split key information across one or more die-to-die interfaces disposed in the first IC die; and enabling operation of functional circuitry in at least one of the first or second IC dies based at least in part on determining that the first split key information meets a first target criteria.

In some examples, obtaining first split key information includes one or both of obtaining a metric of a physical characteristic of a plurality of routings across extending the interface connecting first and second IC dies; accessing entropy to create a first physical unclonable function (PUF) device from the physical characteristics within the connections between the two or more die stack; or obtaining a PUF output signal from a PUF device disposed in the first IC die.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is a flow diagram of a method for authenticating access to an integrated circuit die.

To facilitate understanding, identical reference numerals have been used, where possible, to designate identical elements that are common to the figures. It is contemplated that elements of one embodiment may be beneficially incorporated in other embodiments.

DETAILED DESCRIPTION

Figure 1:
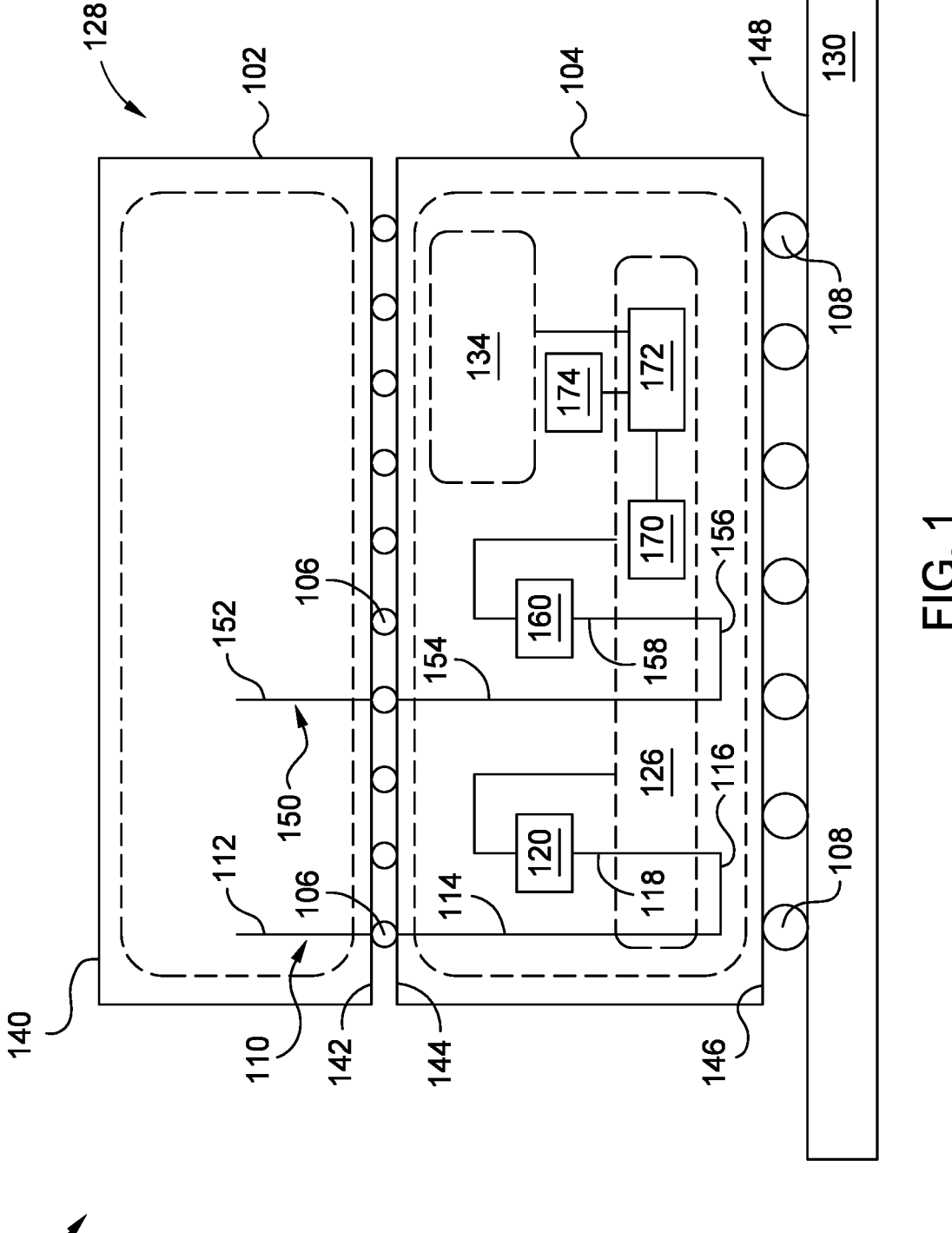
FIG. 1 is a schematic sectional view of an integrated chip package having stacked integrated circuit dies.

As set forth above, many conventional integrated circuit (IC) dies are susceptible to nefarious attacks to gain access to data or circuitry of the die. For example, lids or heat sinks may be removed from the chip package to expose the backside of an IC die through which the functional circuitry of the dies may be excessed using various techniques such as laser voltage probing. Once data paths are derived, decrypted information such as configuration data may be obtained by bypassing the on die security features.

The technology described herein provides an increased level of backside protection from physical attacks that could compromise confidentiality or authentication of the integrated circuit device. Example of physical attacks including laser probing, laser fault injection, focused ion beam attacks by using stacked silicon dies, and other security defeating techniques. The novel security enhancing technique described herein leverages the use of split key information sources disposed in a sacrificial IC die of a die stack to create key splits assembled into an encryption key in a primary IC die of the die stack. The sacrificial IC die may be located above and/or below the primary IC die or dies in the die stack. In other examples, one or more sacrificial IC dies may be located above and below the primary IC die of the die stack. In one example, the split key information sources are embodied as routings that include a unique and repeatedly measurable physical characteristic that can be utilized to create split keys. Removal of the sacrificial die to probe or modify of the primary IC die would cause the destruction of split key information required to boot the circuitry of the primary IC die. Moreover, emulation of the functionality of the sacrificial IC die is infeasible due to complexity, loss of information and density of connections between the sacrificial and primary IC dies, which obscures ability to modify and probe primary IC die. The split key information sources also prevent the deconstruction of stacked IC dies such that the primary IC die from a multitude of stacked die assemblies cannot be reassembled together in a whole or fractional assembly, such that primary dies will not operate with other sacrificial dies not from their original stacked-silicon assembly.

The split key information sources in the sacrificial die contain complex information used to create key splits required to boot the underlying die. Removal of the sacrificial die causes destruction of the information, and thus, destruction of the key splits. If the sacrificial die is removed, providing the information to the primary die would be difficult or infeasible, and would obstruct the ability to observe or modify the primary die. In one example, as routing extending between the sacrificial die and the primary die is used as a split key information sources, where the routing has a unique physical characteristic that can be utilized for encryption key generation. Additionally, split key information sources on the sacrificial die would be routed through a metal on the primary die that is spaced from the sacrificial die, so that delayering of the primary die to gain access to data paths would break the routing, and thus making access to security information impossible.

The sacrificial die can additionally or alternatively include any combination of physical unclonable function (PUF) devices as one or more additional split key information sources. Some suitable PUF devices include, but are not limited to, RO-based PUF devices, SRAM based PUF devices, connection meshes, SRAM, NVM and other sensors and/or PUF devices. The PUF devices also have the benefit that they can be unique to the particular sacrificial die itself, so that what is learned on one sacrificial die needs to be relearned to attack another die. Since it is very difficult to reconstruct all the information required to accurately recreate a key split, using the unique physical characteristic of the routing in combination with PUF outputs significantly enhances protection against physical attacks.

Turning now to FIG. 1, an exemplary integrated chip package 100 is schematically illustrated having a chip stack 128 disposed on a package substrate 130. The chip package 100 may be mounted to a printed circuit board (PCB) together form at least part of an electronic device. The electronic device may be a tablet, computer, copier, digital camera, smart phone, control system, automated teller machine, server or other solid-state memory and/or logic device.

The chip stack 128 is mechanically and electrically coupled to a top surface 148 of the package substrate 130 via solder balls 108 or other suitable connection. The solder balls 108 enable data, power and ground signals to be transferred between the circuitry of the chip stack 128 and the routings of the package substrate 130.

The chip stack 128 includes at least two IC dies, shown in FIG. 1 as a first integrated circuit (IC) die 102 and a second IC die 104. The first IC die 102, referred above as a sacrificial die, includes a plurality of split key information sources utilized to provide security to the second (e.g., primary) IC die 104, as further discussed below. The first IC die 102 generally overlays the second IC die 104 such that within the chip stack 128, the first IC die 102 is separated from the package substrate 130 by the second IC die 104.

There may be one or more additional IC dies between the first IC die 102 and the second IC die 104, between the package substrate 130 and the second IC die 104, or both between the first IC die 102 and the second IC die 104 and between the package substrate 130 and the second IC die 104. It is also contemplated that the second IC die 104 may be alternatively disposed between the package substrate 130 and the first IC die 102.

The first IC die 102 includes a top surface 140 and a bottom surface 142. In FIG. 1, the top surface 140 is the silicon side of the first IC die 102, while the bottom surface 142 of the first IC die 102 is the active (Front and Back End of the Line (FEOL/BEOL)) side of the die. Similarly, the second IC die 104 includes a top surface 144 and a bottom surface 146. In FIG. 1, the top surface 144 is the silicon side of the second IC die 104, while the bottom surface 146 of the second IC die 104 is the active side of the die.

The first IC die 102 is mechanically and electrically coupled to the second IC die 104 via an interface 106. The interface 106 may be comprised of a plurality of solder connections. Alternatively, the interface 106 may be a solderless bond between the first and second IC dies 102, 104. Examples of solderless bonds include wafer-to-wafer hybrid bonding, and the like. In the example depicted in FIG. 1, the bottom surface 142 of the first IC die 102 is coupled to the top surface 144 of the second IC die 104. In another example, the bottom surface 142 of the first IC die 102 is coupled to the bottom surface 146 of the second IC die 104. In yet another example, the top surface 140 of the first IC die 102 is coupled to one of the top or bottom surfaces 144, 146 of the second IC die 104.

The first IC die 102 also include first portions of a plurality of routings. Each of plurality of routings is connected through the interface 106 to a unique one of the routing integrity circuitries located within the second IC die 104. The routings are utilized as split key information sources for providing information utilized to generate key splits for encryption key authentication. For example in FIG. 1, a first portion 112 of a first routing 110 is coupled to first routing integrity circuitry 120 located within the second IC die 104, while a first portion 152 of a second routing 150 is coupled to second routing integrity circuitry 162 located within the second IC die 104. Although only two routings 110, 150 are illustrated in FIG. 1, the first and second IC dies 102, 104 may include thousands of routings 110, 150. Also as illustrated in FIG. 1, the first portions 112, 152 of the routings 110, 150 are dead ended in the first IC die 102. That is, the first portions 112, 152 of the routings 110, 150 are not coupled to power, ground or data circuitries disposed within the first IC die 102.

As discussed above, the second IC die 104 generally includes the routing integrity circuitry coupled to each routing. The second IC die 104 additionally includes security circuitry 126, memory 174 and functional circuitry 134. The memory 174 may be any suitable non-volatile memory, such as Flash memory, ferroelectric random-access memory (FeRAM), magnetic random-access memory (MRAM), phase-change memory (PCM), and resistive random-access memory (RRAM), and the like.

The security circuitry 126 includes key assembly circuitry 170 and authentication circuitry 172. The key assembly circuitry 170 is configured to receive outputs (e.g., key splits) from one of the routing integrity circuitries or summation circuitries and assemble an encryption key. The key splits are based at least in part on physically characteristics of the routing (e.g., the routings 110, 150). The key assembly circuitry 170 outputs the assembled encryption key to the authentication circuitry 172. The authentication circuitry 172 retrieves a stored encryption key from the memory 174 and compares the stored encryption key to the assembled encryption key obtained from the key assembly circuitry 170. If the stored encryption key matches the assembled encryption key, the authentication circuitry 172 outputs a signal that enables the operation of the functional circuitry 134 of the second IC die 104.

As discussed above, the routings 110, 150 reside partially within the second IC die 104. First describing the portions of the first routing 110 formed within the second IC die 104, the first routing 110 has a second portion 114, a third portion 116 and a fourth portion 118. One end of the second portion 114 is exposed on the top surface 144 of the second IC die 104 and is coupled across the interface 106 to the first portion 112 of the first routing 110 residing in the first IC die 102. The connection between the first and second portions 112, 114 makes the interface 106 (i.e., solder or solderless connection) part of the first routing 110. The opposite end of the second portion 114 is coupled to the third portion 116. The third portion 116 connects the second portion 114 to the first routing integrity circuitry 120. The second and fourth portions 114, 118 of the first routing 110 are generally vias, such as copper filled vias. The third portion 116 is generally a line formed in one of the metal layers of the second IC die 104. In one example, the third portion 116 is formed in a metal layer of the second IC die 104 that is closer to the package substrate 130 and farther from the first IC die 102 than the security circuitry 126. In another example, the third portion 116 is formed in a metal layer of the second IC die 104 that is closer to the package substrate 130 and farther from the first IC die 102 than the first routing integrity circuitry 120. In this manner, if an attacker ground the bottom surface 146 of the second IC die 104 to access the functional circuitry 134 or output of the security circuitry 126, the third portion 116 of the first routing 110 would be damaged or removed. Since damaging or removing a portion of the first routing 110 would alter the physically characteristics of the first routing 110, the key split information derived from the damaged first routing 110 would result in an assembled encryption key that would fail to match the stored encryption key. And as such, the authentication circuitry 172 would not output a signal to enable the operation of the functional circuitry 134 of the second IC die 104. Thus, the configuration of the first routing 110 prevents removal of material from the bottom surface 146 of the second die 104 from being a successful mode of attack.

Similarly, the second routing 150 has a second portion 154, a third portion 156 and a fourth portion 158 formed in the second IC die 104. One end of the second portion 154 is exposed on the top surface 144 of the second IC die 104 and is coupled across the interface 106 to the first portion 152 of the second routing 150 residing in the first IC die 102. The opposite end of the second portion 154 is coupled to the third portion 156. The third portion 156 connects the second portion 154 to the second routing integrity circuitry 160. The second and fourth portions 154, 158 of the second routing 150 are generally vias, such as copper filled vias. The third portion 156 is generally a line formed in one of the metal layers of the second IC die 104. In one example, the third portion 156 is formed in a metal layer of the second IC die 104 that is closer to the package substrate 130 and farther from the first IC die 102 than the security circuitry 126. In another example, the third portion 156 is formed in a metal layer of the second IC die 104 that is closer to the package substrate 130 and farther from the first IC die 102 than the second routing integrity circuitry 160. The third portion 156 of the second routing 150 may be on the same or different metal layer than the third portion 116 of the first routing 110.

The first routing integrity circuitry 120 is coupled to the first routing 110. The first routing integrity circuitry 120 is configured to sense a metric of a physical characteristic of the first routing 110. For example, the first routing integrity circuitry 120 may be configured to sense at least one or more of a resistance, a capacitance, or an inductance of the first routing 110. An output of the first routing integrity circuitry 120 is coupled in one example directly to the security circuitry 126, where the sensed metric of the physical characteristic of the first routing 110 (or output based thereon) is utilized as one of the key splits used by the key assembly circuitry 170 to generate an encryption key.

Similarly, the second routing integrity circuitry 150 is coupled to the second routing 150. The second routing integrity circuitry 150 is configured to sense a metric of a physical characteristic of the second routing 150. For example, the second routing integrity circuitry 150 may be configured to sense at least one or more of a resistance, a capacitance, or an inductance of the second routing 150. An output of the second routing integrity circuitry 150 is coupled in one example directly to the security circuitry 126, where the sensed metric of the physical characteristic of the second routing 150 is utilized as another one of the key splits by the key assembly circuitry 170 to generate the encryption key.

As discussed above, additional routing integrity circuitries not shown in FIG. 1 are coupled to additional routings. The additional routing integrity circuitries are configured to sense a metric of a physical characteristic of the routings, and output this information to the security circuitry 126, where the sensed metric of the physical characteristics of the additional routings are utilized as key splits by the key assembly circuitry 170 to generate the encryption key.

Figure 2:
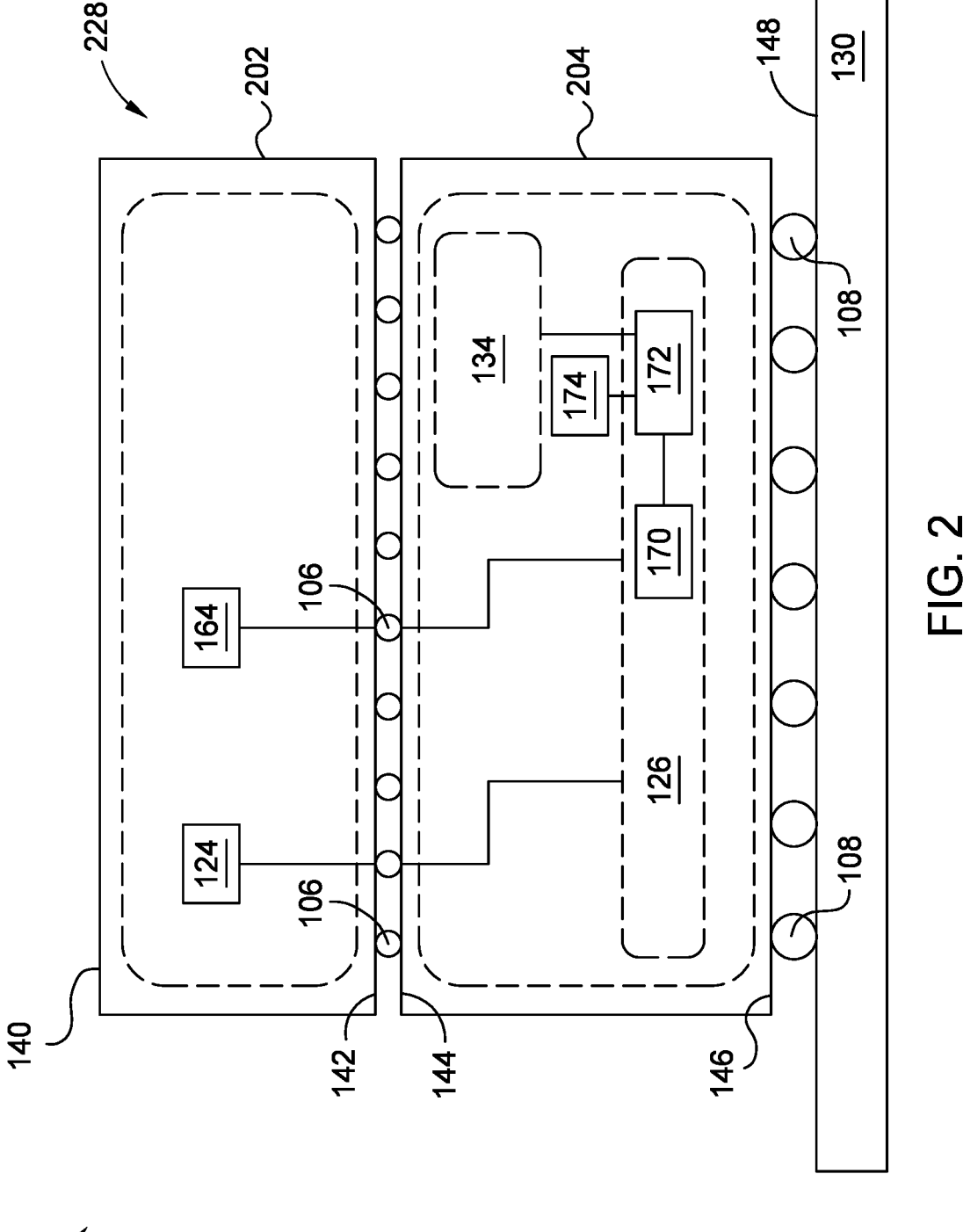
FIG. 2 is a schematic sectional view of another integrated chip package having stacked integrated circuit dies.

FIG. 2 is a sectional schematic view of another example of an integrated chip package 200. The chip package 200 includes a chip stack 228 disposed on a package substrate 130. The chip package 200 may be mounted to a PCB to form at least part of an electronic device.

As with the chip stack 128, the chip stack 228 is mechanically and electrically coupled to a top surface 148 of the package substrate 130 via solder balls 108 or other suitable connection. The solder balls 108 enable data, power and ground signals to be transferred between the circuitry of the chip stack 128 and the routings of the package substrate 130.

The chip stack 228 includes at least two IC dies, shown in FIG. 2 as a first IC die 202 and a second IC die 204. The first IC die 202 is the sacrificial die and includes a plurality of split key information sources utilized to provide security to the second (e.g., primary) IC die 204. The first IC die 202 may overlay the second IC die 204 such as shown in FIG. 2, or alternatively be disposed between the second IC die 204 and the package substrate 130 by the second IC die 204. There may be one or more additional IC dies between the first IC die 202 and the second IC die 204, between package substrate 130 and the second IC die 204, or both between the first IC die 202 and the second IC die 204 and between the package substrate 130 and the second IC die 204.

The first IC die 202 includes a top surface 140 and a bottom surface 142. In FIG. 1, the top surface 140 is the silicon side of the first IC die 202, while the bottom surface 142 of the first IC die 202 is the active side of the die. Similarly, the second IC die 204 includes a top surface 144 and a bottom surface 146. In FIG. 1, the top surface 144 is the silicon side of the second IC die 204, while the bottom surface 146 of the second IC die 204 is the active side of the die.

The first IC die 202 is mechanically and electrically coupled to the second IC die 204 via an interface 106, as described above. The interface 106 may be comprised of a plurality of solder connections. Alternatively, the interface 106 may be a solderless bond between the first and second IC dies 202, 204.

The first IC die 202 includes a plurality of physical unclonable function (PUF) devices. Each of plurality of the plurality of PUF devices is connected through the interface 106 to the security circuitry 126 disposed in the second IC die 204. The PUF devices are utilized as split key information sources to provide information utilized in key split generation for security of the functional circuitry within the second IC die 204. A PUF device can be any physical structure or object formed in the first IC die 202 that produces an instance-specific measurement. For example, due to submicron manufacturing process variations, every structure formed in the first IC die slightly different physical properties, which produce to small but measurable differences in terms of electronic properties. Thus, these electronic properties unique electronic properties enable the substrate or object to function as a unique identifier that provides a "silicon fingerprint" that is utilized to generate key splits. Some exemplary PUF devices include, but are not limited to, ring oscillator-based PUF devices, SRAM based PUF devices, connection meshes, SRAM, NVM and other sensors and/or PUF devices.

Each PUF device is connected through the interface 106 to the security circuitry 126 located within the second IC die 204. For example in FIG. 1, a first PUF device 124 is coupled to the security circuitry 126 located within the second IC die 204, while a second PUF device 164 is also coupled to the security circuitry 126 located within the second IC die 204. Although only two PUF devices 124, 164 are illustrated in FIG. 1, the first IC die 202 may include thousands of PUF devices.

In one example, the PUF device 124 is a ring-oscillator based PUF device. In other examples, the PUF device 124 may be a static random-access memory (SRAM) based PUF device, a connection mesh, SRAM, non-volatile memory (NVM), and other sensors and/or PUF device. The PUF device 124 may be the same or different than one or more of the other PUF devices disposed in first IC die 202.

As with the primary IC die 104, the second IC die 204 in addition to the security circuitry 126 includes memory 174 and functional circuitry 134. As discussed above, the security circuitry 126 includes key assembly circuitry 170 and authentication circuitry 172. The key assembly circuitry 170 is configured to receive outputs (e.g., key splits) from the PUF devices and assemble an encryption key. The key splits are based at least in part on the output of the PUF devices (e.g., the PUF devices 124, 164). The key assembly circuitry 170 outputs the assembled encryption key to the authentication circuitry 172. The authentication circuitry 172 retrieves a stored encryption key from the memory 174 and compares the stored encryption key to the assembled encryption key obtained from the key assembly circuitry 170. If the stored encryption key matches the assembled encryption key, the authentication circuitry 172 outputs a signal that enables the operation of the functional circuitry 134 of the second IC die 204.

As discussed above, the PUF devices 124, 164 reside within the second IC die 204. Separation of the first IC 102 from the second IC die 204 would prevent the split key information generated by the PUF devices 124, 164 from reaching the security circuitry 126. Thus, damaging or removing the first IC 102 would alter the physically prevent the split key information generated by the PUF devices 124, 164 from reaching the security circuitry 126. If a different die replaced the first IC die 102, the PUF devices 124, 164 would not be the same, which would result in an assembled encryption key that would fail to match the stored encryption key. And as such, the authentication circuitry 172 would not output a signal to enable the operation of the functional circuitry 134 of the second IC die 204. Thus, the presence of PUF devices 124, 164 in the first IC die 102 prevents separation of the first and second IC dies 102, 104 from being a successful mode of attack.

As discussed above, the sensed split key information provided by the PUF devices 124, 164 to generate the split keys. In one example, the output of the first PUF device 124 is received by the key assembly circuitry 170 of the security circuitry 126. Similarly, the output of the second PUF device 164 is received by the key assembly circuitry 170 of the security circuitry 126. The key assembly circuitry 170, with the other key split signal outputs of the other PUF devices, generates the encryption key.

Figure 3:
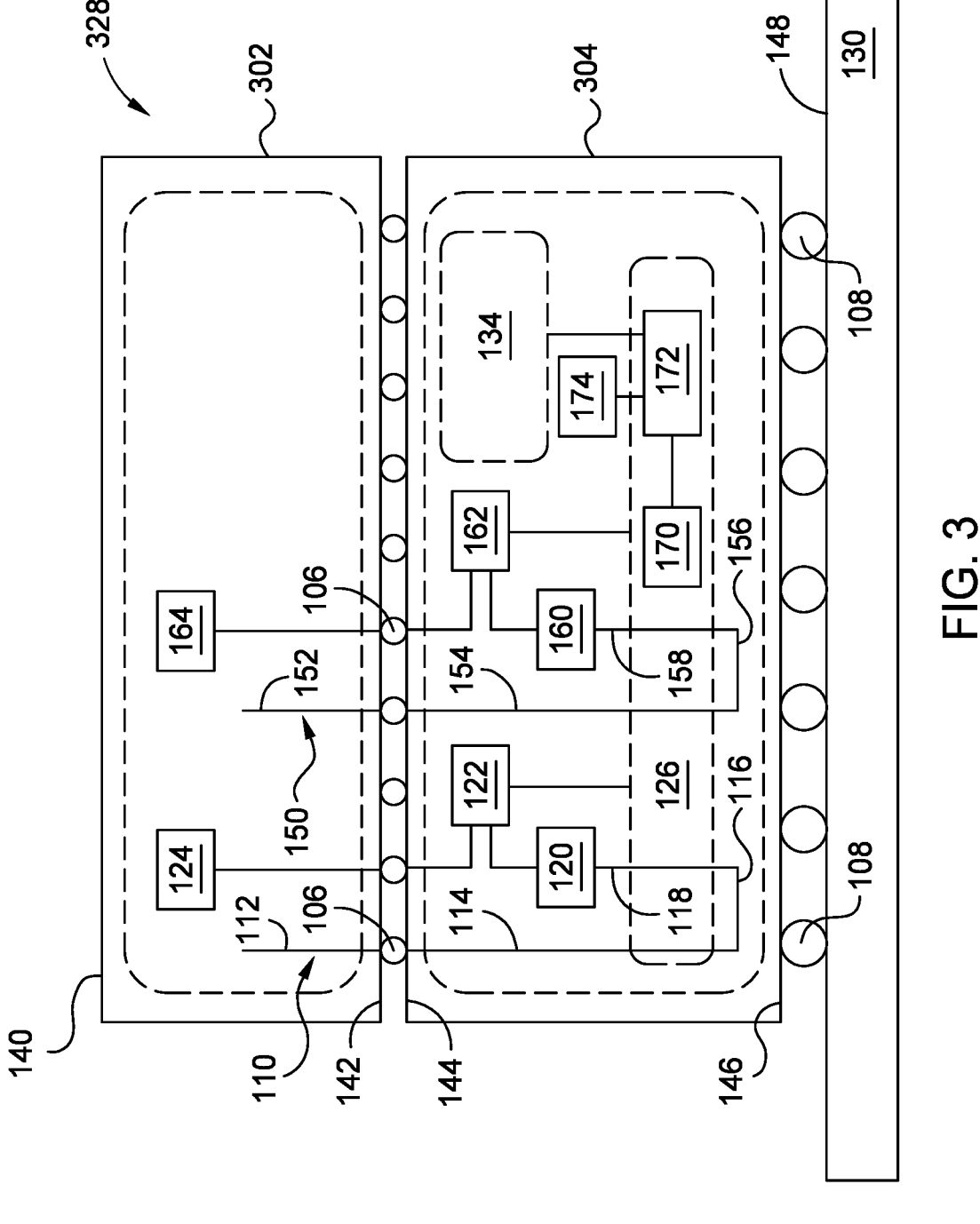
FIG. 3 is a schematic sectional view of another integrated chip package having stacked integrated circuit dies.

FIG. 3 is a sectional schematic view of another example of an integrated chip package 300. The chip package 200 is schematically illustrated having a chip stack 328 disposed on a package substrate 130. The chip package 300 may be mounted to a PCB together form at least part of an electronic device.

The chip stack 328 is mechanically and electrically coupled to a top surface 148 of the package substrate 130 via solder balls 108 or other suitable connection. The solder balls 108 enable data, power and ground signals to be transferred between the circuitry of the chip stack 328 and the routings of the package substrate 130.

The chip stack 328 includes at least two IC dies, shown in FIG. 3 as a first integrated circuit (IC) die 302 and a second IC die 304. The first IC die 302 is a sacrificial die that includes a plurality of split key information sources utilized to provide security to the second IC die 304, as further discussed below. The first IC die 302 generally overlays the second IC die 304 such that within the chip stack 328, the first IC die 302 is separated from the package substrate 130 by the second IC die 304. There may be one or more additional IC dies between the first IC die 302 and the second IC die 304, between the package substrate 130 and the second IC die 304, or both between the first IC die 302 and the second IC die 304 and between the package substrate 130 and the second IC die 304.

The first IC die 302 is generally configured as the dies 102, 202 described above, and includes a top surface 140 and a bottom surface 142. The second IC die 304 is generally configured as the dies 104, 204 described above, and includes a top surface 144 and a bottom surface 146. The first IC die 302 is mechanically and electrically coupled to the second IC die 304 via an interface 106, as described above.

The first IC die 302 also include first portions of a plurality of routings that are utilized as split key information sources, such as the routings disposed in the first die 102 described with reference to FIG. 1. Each of plurality of routings is connected through the interface 106 to a unique one of the routing integrity circuitries located within the second IC die 304. The routings provide split key information that is utilized to generate key splits for encryption key authentication. For example in FIG. 3, a first portion 112 of a first routing 110 is coupled to first routing integrity circuitry 120 located within the second IC die 304, while a first portion 152 of a second routing 150 is coupled to second routing integrity circuitry 162 located within the second IC die 304. Although only two routings 110, 150 are illustrated in FIG. 3, the first and second IC dies 302, 304 may include thousands of routings 110, 150. Also as illustrated in FIG. 3, the first portions 112, 152 of the routings 110, 150 are dead ended in the first IC die 302. That is, the first portions 112, 152 of the routings 110, 150 are not coupled to power, ground or data circuitries disposed within the first IC die 302.

In addition to the routings 110, 150, the first IC die 302 also includes a plurality of physical unclonable function (PUF) devices, such as disposed in the first die 202 described with reference to FIG. 2. Each PUF device is connected through the interface 106 to a unique one of a plurality of summation circuitries located within the second IC die 304. For example in FIG. 3, a first PUF device 124 is coupled to first summation circuitry 122 located within the second IC die 304, while a second PUF device 164 is coupled to second summation circuitry 162 located within the second IC die 304. Although only two PUF devices 124, 164 are illustrated in FIG. 3, the first IC die 302 may include thousands of PUF devices.

In one example, the PUF device 124 is a ring-oscillator based PUF device. In other examples, the PUF device 124 may be a static random-access memory (SRAM) based PUF device, a connection mesh, SRAM, non-volatile memory (NVM), and other sensors and/or PUF device. The PUF device 124 may be the same or different than one or more of the other PUF devices disposed in first IC die 302.

The second IC die 304 additionally includes security circuitry 126, memory 174 and functional circuitry 134. The memory 174 may be any suitable non-volatile memory, such as Flash memory, ferroelectric random-access memory (Fe-RAM), magnetic random-access memory (MRAM), phase-change memory (PCM), and resistive random-access memory (RRAM), and the like.

The security circuitry 126 includes key assembly circuitry 170 and authentication circuitry 172. The key assembly circuitry 170 is configured to receive outputs (e.g., key splits) from one of the routing integrity circuitries or summation circuitries and assemble an encryption key. The key splits are based at least in part on physically characteristics of the routing (e.g., the routings 110, 150). The key assembly circuitry 170 outputs the assembled encryption key to the authentication circuitry 172. The authentication circuitry 172 retrieves a stored encryption key from the memory 174 and compares the stored encryption key to the assembled encryption key obtained from the key assembly circuitry 170. If the stored encryption key matches the assembled encryption key, the authentication circuitry 172 outputs a signal that enables the operation of the functional circuitry 134 of the second IC die 304.

As discussed above, the routings 110, 150 reside partially within the second IC die 304. First describing the portions of the first routing 110 formed within the second IC die 304, the first routing 110 has a second portion 114, a third portion 116 and a fourth portion 118. One end of the second portion 114 is exposed on the top surface 144 of the second IC die 304 and is coupled across the interface 106 to the first portion 112 of the first routing 110 residing in the first IC die 302. The connection between the first and second portions 112, 114 makes the interface 106 (i.e., solder or solderless connection) part of the first routing 110. The opposite end of the second portion 114 is coupled to the third portion 116. The third portion 116 connects the second portion 114 to the first routing integrity circuitry 120. The second and fourth portions 114, 118 of the first routing 110 are generally vias, such as copper filled vias.

The third portion 116 is generally a line formed in one of the metal layers of the second IC die 304. In one example, the third portion 116 is formed in a metal layer of the second IC die 304 that is closer to the package substrate 130 and farther from the first IC die 302 than the security circuitry 126. In another example, the third portion 116 is formed in a metal layer of the second IC die 304 that is closer to the package substrate 130 and farther from the first IC die 302 than the first routing integrity circuitry 120. In this manner, if an attacker ground the bottom surface 146 of the second IC die 304 to access the functional circuitry 134 or output of the security circuitry 126, the third portion 116 of the first routing 110 would be damaged or removed. Since damaging or removing a portion of the first routing 110 would alter the physically characteristics of the first routing 110, the key split information derived from the damaged first routing 110 would result in an assembled encryption key that would fail to match the stored encryption key. And as such, the authentication circuitry 172 would not output a signal to enable the operation of the functional circuitry 134 of the second IC die 304. Thus, the configuration of the first routing 110 prevents removal of material from the bottom surface 146 of the second die 304 from being a successful mode of attack.

Similarly, the second routing 150 has a second portion 154, a third portion 156 and a fourth portion 158 formed in the second IC die 304. One end of the second portion 154 is exposed on the top surface 144 of the second IC die 304 and is coupled across the interface 106 to the first portion 152 of the second routing 150 residing in the first IC die 302. The opposite end of the second portion 154 is coupled to the third portion 156. The third portion 156 connects the second portion 154 to the second routing integrity circuitry 160. The second and fourth portions 154, 158 of the second routing 150 are generally vias, such as copper filled vias. The third portion 156 is generally a line formed in one of the metal layers of the second IC die 304. In one example, the third portion 156 is formed in a metal layer of the second IC die 304 that is closer to the package substrate 130 and farther from the first IC die 302 than the security circuitry 126. In another example, the third portion 156 is formed in a metal layer of the second IC die 304 that is closer to the package substrate 130 and farther from the first IC die 302 than the second routing integrity circuitry 160. The third portion 156 of the second routing 150 may be on the same or different metal layer than the third portion 116 of the first routing 110.

The first routing integrity circuitry 120 is coupled to the first routing 110. The first routing integrity circuitry 120 is configured to sense a metric of a physical characteristic of the first routing 110. For example, the first routing integrity circuitry 120 may be configured to sense at least one or more of a resistance, a capacitance, or an inductance of the first routing 110. An output of the first routing integrity circuitry 120 is coupled in one example directly to the security circuitry 126, where the sensed metric of the physical characteristic of the first routing 110 (or output based thereon) is utilized as one of the key splits used by the key assembly circuitry 170 to generate an encryption key.

Similarly, the second routing integrity circuitry 150 is coupled to the second routing 150. The second routing integrity circuitry 150 is configured to sense a metric of a physical characteristic of the second routing 150. For example, the second routing integrity circuitry 150 may be configured to sense at least one or more of a resistance, a capacitance, or an inductance of the second routing 150. An output of the second routing integrity circuitry 150 is coupled in one example directly to the security circuitry 126, where the sensed metric of the physical characteristic of the second routing 150 is utilized as another one of the key splits by the key assembly circuitry 170 to generate the encryption key.

As discussed above, additional routing integrity circuitries not shown in FIG. 3 are coupled to additional routings. The additional routing integrity circuitries are configured to sense a metric of a physical characteristic of the routings, and output this information to the security circuitry 126, where the sensed metric of the physical characteristics of the additional routings are utilized as key splits by the key assembly circuitry 170 to generate the encryption key.

As discussed above, the sensed metric of the physical characteristic of the first routing 110 may used alone or in conjunction with a PUF device (e.g., the first PUF device 124) disposed in the first IC die 302 to generate the split keys. In one example, both the output of the first routing integrity circuitry 120 and the first PUF device 124 are received by the first summation circuitry 122. The first summation circuitry 122 combines the outputs from the first routing integrity circuitry 120 and the first PUF device 124, and outputs a first key split signal that is received by the key assembly circuitry 170 of the security circuitry 126. Similarly, both the output of the second routing integrity circuitry 150 and the second PUF device 164 are received by the second summation circuitry 162. The second summation circuitry 162 combines the outputs from the second routing integrity circuitry 150 and the second PUF device 164, and outputs a second key split signal that is received by the key assembly circuitry 170 of the security circuitry 126 and utilized with the other key split signal outputs of the other summation circuitries to generate the encryption key.

In another example, the first summation circuitry 122 compares the outputs of the first routing integrity circuitry 120 and the first PUF device 124, and outputs a first key split signal based on the comparison that is received by the key assembly circuitry 170 of the security circuitry 126. The comparison may be that one of output of the first routing integrity circuitry 120 and the output of the first PUF device 124 meets a predefined criteria. The predefined criteria may be stored in the memory 174. The predefined criteria may be one or more of a resistance, inductance and/or capacitance of the first routing 110. Alternatively, or in addition, the predefined criteria may be that the output of the first PUF device 124 meets a predefined criteria, such as frequency. The second routing integrity circuitry 150 can be similarly configured.

In yet another example, the output of first summation circuitry 122 is the result of a logic function, such as a mathematical expression or lookup table, that utilizes the outputs of the first routing integrity circuitry 120 and the first PUF device 124 as input variables.

Figure 4:
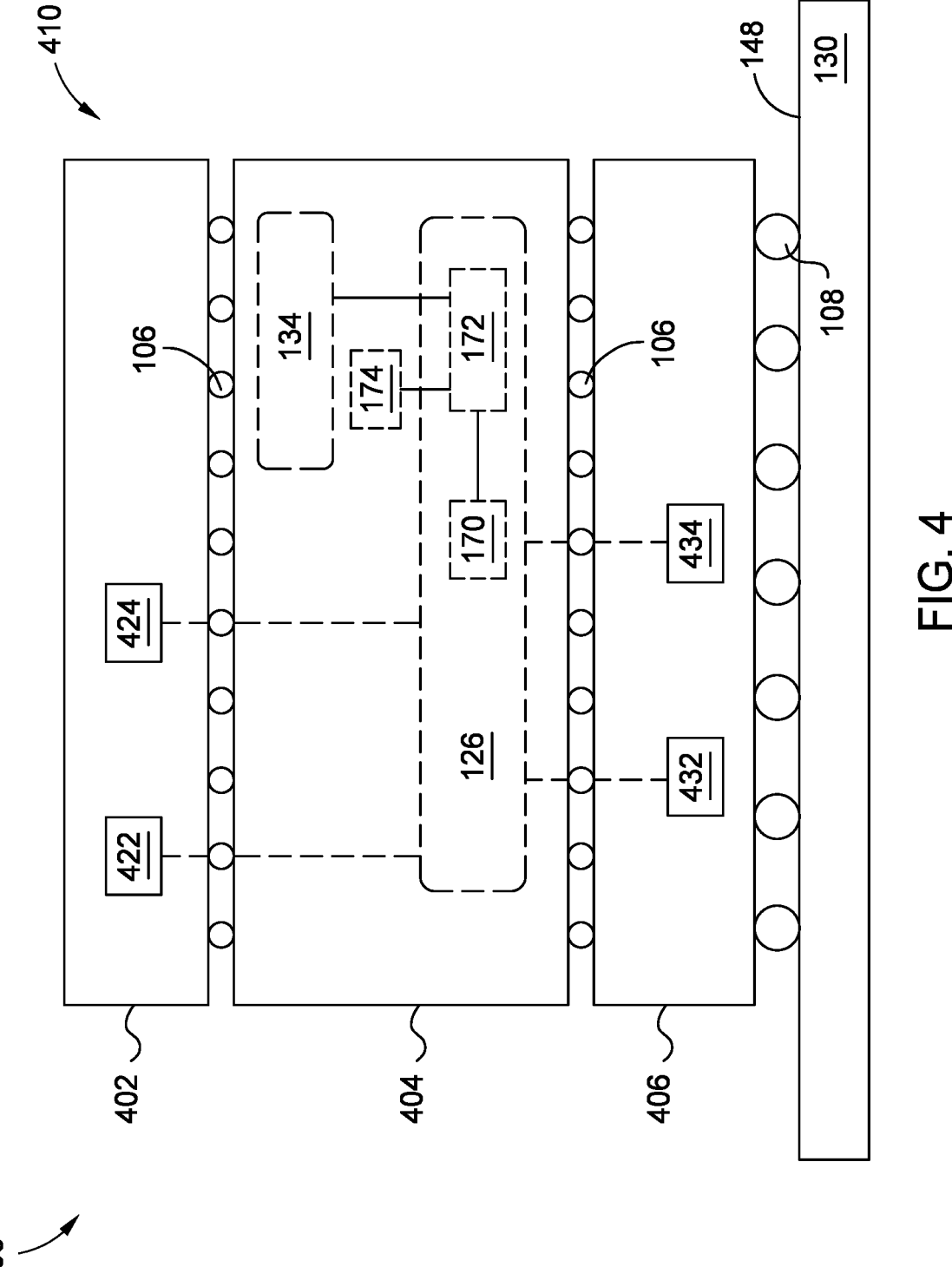
FIG. 4 is a schematic sectional view of yet another integrated chip package having stacked integrated circuit dies.

FIG. 4 a sectional schematic view of another example of an integrated chip package 400. The chip package 400 is schematically illustrated having a chip stack 410 disposed on a package substrate 130. The chip package 400 may be mounted to a PCB together form at least part of an electronic device.

The chip stack 410 includes at least one primary IC die 404 having at least one overlying security IC die 402 and at least one underlying sacrificial die 406. The sacrificial die 406 is mounted to the package substrate 130. Although in FIG. 4 only one overlying security IC die 402, one primary IC die 404, and one underlying sacrificial die 406 are shown, one or more overlying security IC dies 402 may be disposed on one or more primary IC dies 404, which may be disposed on one or more underlying sacrificial dies 406.

Each of the sacrificial dies 402, 406 include one or more types of split key information sources that are coupled through interfaces 106 to the security circuitry 126 of the primary IC die 404. Thus, the security circuitry 126 of the primary IC die 404 requires split key information source information acquired from both of the sacrificial dies 402, 406 in order to generate the encryption key within the primary IC die 404.

The split key information sources within the overlying sacrificial die 402 may be configured either as routings or PUF devices, or both as routings and PUF devices. For example, the overlying sacrificial die 402 may be configured as any one of the sacrificial dies 102, 202, or 304. Similarly, the underlying sacrificial die 406 may be configured as any one of the sacrificial dies 102, 202, or 304. Accordingly, the primary IC die 404 may be configured as any of the primary IC dies 104, 204, or 304, with the addition that the primary IC die 404 has addition routing configured to receive split key information from the split key information sources through the interfaces 106 on the top and bottom surfaces of the primary IC die 404 from the respective over and underlying sacrificial dies 402, 406.

In operation, the security circuitry 126 provide authentication for enabling secure operation of the chip packages 100, 200, 300, 400 using one or both of the metrics of the routings 110, 150, and the outputs the PUF devices 124, 164. The operation of the chip packages 100, 200, 300, 400 and similarly configured chip packages is illustrated in FIG. 5 with a flow diagram of a method 500 for operating a chip package. It is contemplated that the method 500 can be used with chip packages having other configurations.

The method 500 for operating a chip package begins at operation 502 by obtaining split key information across one or more die-to-die interfaces. The split key information may be a metric of a physical characteristic of routings that extends across an interface connecting first and second IC dies. The routings include a first portion disposed in the first IC die, a second portion disposed in the second IC die, and a third portion disposed in the interface. In another example, the split key information may be an output of a PUF device routed across an interface connecting first and second IC dies. In yet another example, the split key information is derived from both a metric of a physical characteristic of routings that extends across an interface connecting first and second IC dies, and an output of a PUF device routed across an interface connecting first and second IC dies. The split key information sources may be provided to the primary IC die from one or more sacrificial IC dies, and the one or more sacrificial IC dies may be located above, below, or above and below the primary IC die.

At operation 504, operation of functional circuitry in at least one of the first or second IC dies is enabled. The functional circuitry may be enabled based at least in part on determining that the metric of the physical characteristic of the first routing meets a first target criteria. For example, the metric of the physical characteristic of the routing may be embodied in a key splits, then as an encryption key generated using the key splits. The encryption key generated using the key splits is authenticated against a stored encryption key that requires that target criteria of the routings be met.

For example, if a first routing has a physical characteristic of X, where X is one of resistance, capacitance or inductance, then the key split would embody information based on X. For an encryption key generated using the key splits information based on X to be authenticated against the stored encryption key, the stored encryption key would have matching information. If the first routing is damaged, the physical characteristic of the first routing would no longer be X, for example now Y, the key split would embody information based on Y and no longer be able to be authenticated against the stored encryption key (which would be based on the original physical characteristic of X).

In one example, obtaining a metric of a physical characteristic of the routings may include additional operations. For example, at least one of sensing at least one of resistance, capacitance or inductance of the first routing.

In another example, the functional circuitry may be enabled based at least in part on determining an output of a PUF devices meets a first target criteria. In yet another example, the functional circuitry may be enabled based at least in part on determining both a metric of a physical characteristic of the routings and an output of a PUF devices meet target criteria.

In one example, obtaining split key information across one or more die-to-die interfaces at operation 502 includes operations 506, 508, 510 and 512. At operation 506, a PUF output signal or a metric of a physical characteristic of a first routing extending across the die-to-die interface is obtained. At operation 508, output signals (e.g., key splits) based on at least one or both of the PUF output signal and the metric of a physical characteristic of the first routing are generated. At operation 510, an encryption key based at least one or both of the PUF output signal and the metric of a physical characteristic of the first routing is generated. If the generated encryption key is authenticated at operation 512, the method 500 proceeds to operation 504 that enables operation and/or access to the functional circuitry of the primary IC die that is stacked with the one or more sacrificial IC dies.

Thus, as described above, split key information sources in a sacrificial IC die are utilized for protect information in a primary IC die stacked therewith, where removal of the sacrificial die to probe or modify primary IC die causes destruction of information required to boot the circuitry of the primary IC die. The sacrificial IC die includes split key information sources in the form of PUF devices and/or routings from which unique physical identification criteria is utilized as encryption key splits. Emulation of the functionality of the sacrificial IC die (i.e., the physical criteria/properties of the routings) is infeasible due to complexity, loss of information and density of connections between the sacrificial and primary IC dies, which obscures ability to modify and probe primary IC die. The sacrificial top IC die cannot be removed without destruction of the sensor information, thus destroying the information needed to enable an authenticatable key split. Moreover as portions of the routing are located through a metal layers on the underlying die near the bottom the sacrificial IC die, delayering of the primary IC die to gain access to data paths would break the routing, and thus making access to security information impossible. Accordingly, security of the primary IC die is significantly enhanced over conventional techniques.

While the foregoing is directed to embodiments of the present invention, other and further embodiments of the invention may be devised without departing from the basic scope thereof, and the scope thereof is determined by the claims that follow.

What is claimed is:
1. A chip stack, comprising:
  first and second integrated circuit (IC) dies and a package substrate in a stacked configuration, wherein the second IC die is disposed between the first IC die and the package substrate;

a first entropy source distributed across the first and second IC dies; and security circuitry disposed in the second IC die and configured to generate a first key that is unique to the chip stack based at least in part on a measure of entropy of the first entropy source;

wherein the first entropy source comprises a first routing, wherein a first portion of the first routing is disposed in the first IC die, a second portion of the first routing is disposed in the second IC die, and an interface between the first and second IC dies comprises a third portion of the first routing;

wherein the second portion of the first routing comprises routing residing in a metal layer of the second IC die that is closer to the package substrate and further from the first IC die than the security circuitry; and wherein the chip stack further comprises:

a second entropy source comprising a first physical unclonable function (PUF) device disposed in the first IC die and coupled to the second IC die through the interface; and first summation circuitry disposed in the second IC die, configured to output a first key signal based on a comparison of the measures of entropy of the first and second entropy sources the first PUF device; and wherein the security circuitry comprises key assembly circuitry configured to generate the key based on the first key signal.

2. The chip stack of claim 1, further comprising:

first routing integrity circuitry disposed in the second IC die and configured to sense the measure of entropy of the first entropy source.

3. The chip stack of claim 2, wherein the first entropy source comprises one or more of a resistance, a capacitance, and an inductance.

4. The chip stack of claim 2, wherein the security circuitry comprises authentication circuitry configured to authenticate the chip stack based on the key.

5. The chip stack of claim 1, wherein the first entropy source further comprises:

a first physical unclonable function (PUF) device disposed in the first IC die and coupled to the first portion of the first routing.

6. The chip stack of claim 5, wherein the first PUF device comprises one or more of an oscillator, static random-access memory, a connection mesh, and non-volatile memory.

7. The chip stack of claim 1, further comprising:

a third entropy source comprising a second PUF device disposed in the first IC die and coupled to the second IC die through the interface; and a fourth entropy source comprising a second routing;

wherein a first portion of the second routing is disposed in the first IC die, a second portion of the second routing is disposed in the second IC die, and the interface comprises a third portion of the second routing; and wherein the second portion of the second routing comprises routing residing in the metal layer of the second IC die that is closer to the package substrate and further from the first IC die than the security circuitry;

second routing integrity circuitry disposed in the second IC die and configured to sense a measure of entropy of the fourth entropy source; and second summation circuitry disposed in the second IC die, configured to output a second key signal based on a comparisons of a measure of entropy of the third entropy source and the measure of entropy of the fourth entropy source;

wherein the key assembly circuitry is configured to generate the key based further on the second key signal.

8. The chip stack of claim 2, wherein the second portion of the first routing is dead ended in the first IC die.

9. A chip package, comprising:

first and second integrated circuit (IC) dies and a package substrate in a stacked configuration, wherein the second IC die is disposed between the first IC die and the package substrate;

a first entropy source comprising a first routing extending across an interface connecting the first and second IC dies, wherein a first portion of the first routing is disposed in the first IC die, a second portion of the first routing is disposed in the second IC die, and a third portion of the first routing is disposed in the interface;

first routing integrity circuitry disposed in the second IC die and coupled to the second portion of the first routing, wherein the first routing integrity circuitry is configured to output a measure of entropy of the first entropy source;

key assembly circuitry disposed in the second IC die routing, the key assembly circuitry configured to generate a key based at least in part on the measure of entropy of the first entropy source; and authentication circuitry disposed in the second IC die configured to authenticate the chip package based on the key;

a first physical unclonable function (PUF) device disposed in the first IC; and first summation circuitry disposed in the second IC die, configured to output a first key signal based on a comparison of measures of entropy of the first and second entropy sources;

wherein the second portion of the first routing comprises routing residing in a metal layer of the second IC die that is closer to the package substrate and further from the first IC die than the first routing integrity circuitry, the key assembly circuitry, and the authentication circuitry.

10. The chip package of claim 9, wherein the first entropy source comprises one or more of a resistance, a capacitance, and an inductance.

11. The chip package of claim 9, wherein the second IC die is mounted directly to the first IC die.

12. The chip package of claim 9, wherein the first PUF device comprises one or more of a ring-oscillator, static random-access memory, a connection mesh, and non-volatile memory.

13. An integrated circuit (IC) device, comprising:

first and second integrated circuit (IC) dies and a package substrate in a stacked configuration, wherein the second IC die is disposed between the first IC die and the package substrate;

first and second entropy sources, each distributed amongst the first and second IC dies;

a summation circuit disposed in the second IC die and configured to output a key signal based on measures of entropy of the first and second entropy sources; and security circuitry configured to generate a key that is unique to the IC device based on the key signal;

wherein the summation circuit is further configured to output the key signal based on a comparison of the measures of entropy of the first and second entropy sources.

14. The IC device of claim 13, wherein:

the summation circuit is further configured to output the key signal based on a comparison of the measures of entropy of the first and second entropy sources to predefined criteria.

15. The IC device of claim 13, wherein the summation circuit comprises:

a logic function configured to output the key signal based on the measures of entropy of the first and second entropy sources.

16. The IC device of claim 13, wherein:

the first entropy source comprises a first routing, wherein a first portion of the first routing is disposed in the first IC die, a second portion of the first routing is disposed in the second IC die, and an interface between the first and second IC dies comprises a third portion of the first routing; and the second portion of the first routing comprises routing residing in a metal layer of the second IC die that is closer to the package substrate and further from the first IC die than the security circuitry.

\* \* \* \* \*